Oct. 24, 1933.    R. B. FAGEOL ET AL    1,931,723
SEALING DEVICE
Filed June 27, 1929    2 Sheets-Sheet 1
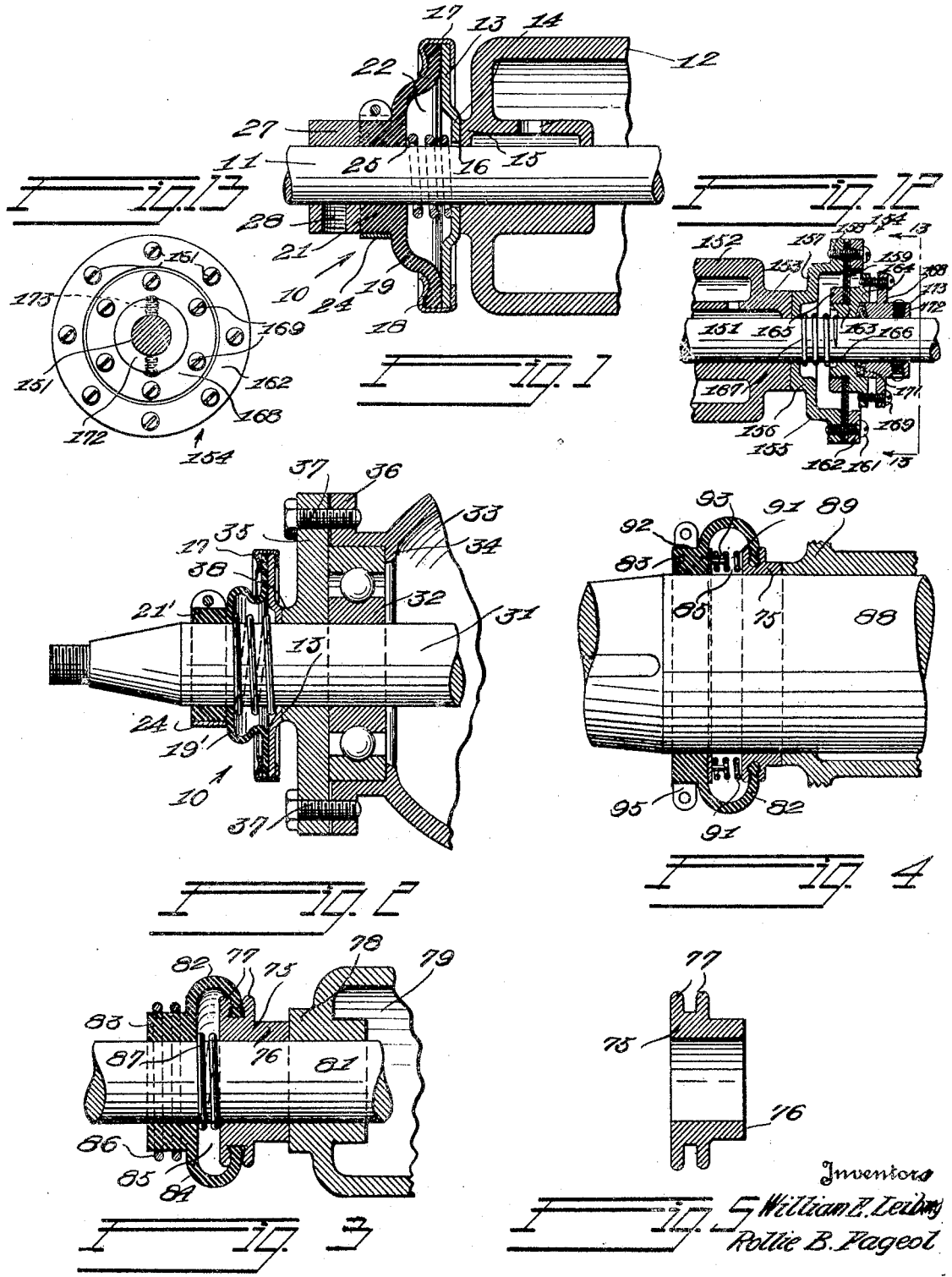

Oct. 24, 1933.  R. B. FAGEOL ET AL  1,931,723
SEALING DEVICE
Filed June 27, 1929   2 Sheets-Sheet 2
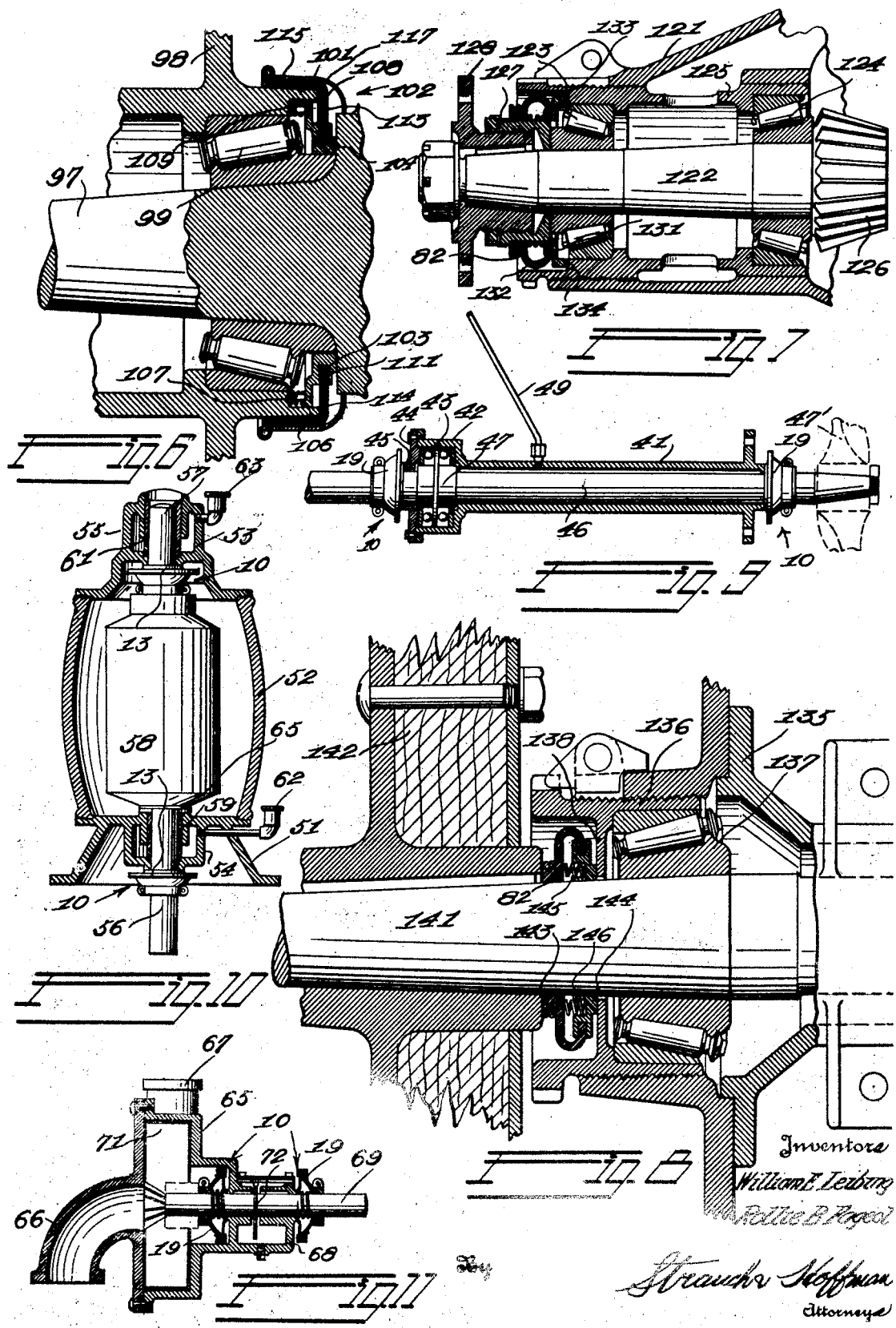

Patented Oct. 24, 1933

1,931,723

UNITED STATES PATENT OFFICE 1,931,723

SEALING DEVICE

Rollie B. Fageol, Los Angeles, and William E. Leibing, Sausalito, Calif.

Application June 27, 1929. Serial No. 374,036

5 Claims. (Cl. 286—11)

This invention relates to liquid sealing devices of the type disclosed in the copending application of William E. Leibing, Serial Number 336,559, filed January 31, 1929, and consists in an improvement on the device of said application.

Heretofore great difficulty has been encountered in preventing liquid contained in a housing, that supports a rotating shaft, from escaping from the housing on the shaft. The difficulty just referred to is encountered, particularly, in automotive constructions, in which the housings contain lubricant for minimizing friction between the moving parts and the bearings therefor. The same difficulty arises in pump and fluid motor constructions of various types and in very many other relations. Various constructions have been proposed to obviate the difficulty just referred to, but such constructions have not generally been entirely satisfactory for one of two principal reasons. The first of these reasons is that constructions heretofore proposed that were effective in preventing the escape of liquid from the housing had only a short life, and required frequent replacement with consequent annoyances, and frequent injury to the working parts due to the loss of liquid from the housing between replacements. The second reason for the unsuitableness of constructions heretofore proposed is that they frequently imposed relatively great resistance to the rotation of the shaft relative to the housing in which it is mounted. That is, the packings or sealing devices, if arranged to successfully prevent the escape of liquid from the housing for a long period of time under conditions of service, imposed substantial frictional resistances to the rotation of the shaft resulting in substantial losses of power.

The primary object of this invention is to provide a liquid seal of simple construction that is entirely effective to prevent the escape of liquid from a housing along a shaft journalled therein, that does not impose substantial frictional resistance to the rotation of the shaft, and that at the same time has a long life.

A further object of the invention is to provide a sealing device embodying a non-metallic sleeve that is secured to the shaft in a leak-proof manner for rotation as a unit with the shaft, and that has secured thereto a metallic member arranged to slidingly bear against an annular sealing surface of the housing surrounding the exterior of the shaft.

A still further object of the invention is to provide a liquid sealing device, including a preferably resilient non-metallic element and a metallic element secured thereto to reduce the friction between the relatively movable parts, in which the non-metallic member is accessibly arranged externally of the housing so that the liquid does not contact with and shorten the life thereof.

A still further object of the invention is to provide a liquid sealing device embodying a non-metallic element arranged to rotate with the shaft and to prevent the flow of liquid along the shaft and a metallic element designed for sliding contact with the housing under light but uniform pressure endwise the shaft in a manner to prevent the flow of liquid in a direction at right angles to the shaft at the point where the shaft projects from the housing.

A still further object of the invention is to provide a liquid sealing device embodying a non-metallic element and a metallic element associated so that the non-metallic element tends, due to its inherent resilience, as well as its shape, to firmly but lightly press the metallic element in contact with the housing to prevent the flow of lubricant or liquid from said housing.

A still further object of the invention is to provide a liquid sealing device embodying a non-metallic element and a metallic member in which the non-metallic element is constructed in the form of a sleeve that surrounds the shaft and that is secured thereto at one point and at another point thereof is spaced therefrom to provide a chamber closed by the metallic element, which chamber may be used to house a relatively light spring to supplement the action of the non-metallic element in firmly but lightly pressing said metallic element into contact with an annular sealing surface formed on said element and the portion of the housing with which it is pressed into contact.

A further object of the invention is to provide a liquid sealing device involving a sleeve-like non-metallic and inherently flexible and resilient element and a metallic member in which the metallic member is connected to the non-metallic element in an extremely simple and practical manner.

With the above objects in view as well as others that will present themselves during the course of the following disclosure, reference will be had to the accompanying drawings forming part of same and in which:

Figure 1 is an axial vertical sectional view of a preferred form of sealing device constructed in accordance with the present invention, the sealing device being shown in operative relation with a rotating shaft and housing illustrating one of many applications of the sealing device.

Figure 2 is a similar view illustrating a modified form of sealing device in operative relation with a rotating shaft and housing of bearing therefor.

Figure 3 is a similar view of a still further modified form of sealing device shown in operative relation with a rotating shaft and housing therefor.

Figure 4 is a similar view disclosing a still further modification of the invention.

Figure 5 is an axial vertical sectional view of a portion of the sealing device illustrated in Figure 3.

Figure 6 is an axial vertical sectional view of a still further modification of the invention illustrated in operative relation with a spindle and front wheel mount for which this form of the invention is especially adapted.

Figure 7 is an axial vertical sectional view of a still further modification of the invention in operative relation with a vehicle propeller shaft and housing therefor.

Figure 8 is a similar view showing a still further modified form of sealing device in operative relation with a vehicle rear axle construction.

Figures 9, 10 and 11 are vertical sectional views disclosing different examples of applications of the sealing device illustrated in Figure 1.

Figure 12 is an axial vertical sectional view of a still further modification of the invention.

Figure 13 is an end elevational view on a plane represented by line 13—13 in Figure 12.

Referring to the drawings by reference characters in which like characters designate like parts, and referring first to Figure 1, 10 designates a sealing device constituted in accordance with a preferred embodiment of the invention and illustrated in operative relation with a rotating shaft 11 and housing 12 in which shaft 11 has bearing.

The housing 12, customarily is formed to provide a receptacle for oil for lubricating the rotating shaft 11 and bearing therefor in housing 12. The sealing device 10, which constitutes the present invention, is adapted for cooperation with shaft 11 and housing 12 for preventing loss of oil from housing 12 through the shaft opening in the end wall thereof without imposing substantial frictional resistance to the rotation of said shaft. As illustrated in Figure 1 the sealing device 10, in a preferred embodiment thereof, comprises a metallic disk 13 which is a sheet steel punching provided with an offset central bearing portion 14 for bearing engagement with a portion of the housing, such as a boss 15 formed on said housing in surrounding relation to the shaft opening in the end wall thereof.

The bearing face of portion 14 is preferable hardened and ground for sealing bearing engagement with boss 15. Disk 13 is provided centrally of portion 14 with an aperture 16 that may be of slightly greater diameter than that of shaft 11.

Secured into oil tight engagement with the outer surface of disk 13 adjacent the periphery thereof by means of a soft copper clincher rim member 17 is the rim portion 18 of a substantially bell shaped yieldable sealing member 19, which is provided with a centrally apertured hub portion 21 for snug engagement with shaft 11 in spaced relation to disk 13 thus providing a chamber 22 within sealing device 10. The shaft receiving aperture in hub 21 may be substantially smaller than shaft 11 for frictionally engaging same and an annular contractible clamp 24 is engaged with the outer surface of hub 21 for drawing same into firm sealing engagement with shaft 11 and so that the sealing member 19 as well as disk 13 is secured to and constructed to be positively rotatable with shaft 11.

The yieldable sealing member 19 is preferably constructed of oil proof rubber, which, due to the readily yieldable properties thereof, provides a good oil seal with shaft 11 and disk 13. The flange portion of member 19 is of such thickness and form as to yieldingly urge bearing portion 14 of disk 13 to which it is secured into bearing contact with boss 15.

While yieldable member 19 urges disk 13 into engagement with boss 15 this pressure may not alone be sufficient to maintain a sealing engagement between portion 14 and boss 15 under operating conditions and accordingly a light helical compression spring 25 may be interposed between disk 13 and hub 21 of member 19 in surrounding relation to shaft 11 for providing a supplementary pressure urging disk 13 toward housing 12 firmly but lightly, providing sufficient bearing pressure between portion 14 and boss 15 to prevent separation thereof under any oil pressure occasioned by rotation of shaft 11 with respect to housing 12. If desired, a collar 27 may be secured to shaft 11 by a screw engaging a tap 28 therein for assisting clamp 24 in positively preventing movement of hub 21 longitudinally of shaft 11 under the continued expansive action of spring 25 under conditions of service.

Upon rotation of shaft 11 the sealing device 10 rotates as a unit with the bearing portion 14 of disk 13 held in light sealing engagement with boss 15 by the combined action of member 19 and spring 25. As the shaft rotates oil flows to the bearing surfaces of disk portion 14 and boss 15 in sufficient quantity to keep them properly lubricated, but the sealing engagement of the surfaces 14 and 15 is such as to prevent the loss of oil from housing 12 between these bearing surfaces. In view of the light pressure and ground surfaces low torque effort, low heat generation, and excellent wearing qualities are characteristic of the described construction.

A light yielding pressure on disk 13 is sufficient to seal the average bearing not subject to substantial pressure from inside the housing. High pressures are automatically compensated for in the following manner. Pressure in the oil chamber in housing 12 is transmitted through the shaft bearing and disk 13 into chamber 22 in sealing device 10 and as the hub 21 of member 19 is fixed against movement longitudinally of shaft 11. Any increase in pressure in housing 12 provides a corresponding increase of pressure in chamber 22 resulting in portion 14 of disk 13 being held with corresponding increased pressure in bearing engagement with boss 15.

In accordance with the construction just described an oil sealing device for rotating shafts is provided which is simple in construction, relatively inexpensive of manufacture and capable of being installed with a minimum expenditure of time and labor. Furthermore, the device disclosed provides a seal which, due to its rotation with the shaft to which it is secured is not subject to friction except for engaging portions 14 and 15, thus providing a seal which will function for a comparatively long period of time and due to the expansible chamber 22 verging pressures within housing 12 will be automatically compensated for by providing just sufficient pressure engagement between disk portion 14 and boss 15 for effective lubrication without the loss of lubricant from the oil chamber within housing 12.

In Figure 2 is illustrated a slightly modified form of the invention in which the sealing device 10 is adapted for rotating shafts subject to slight longitudinal movement in their bearings and in which the shaft is not lubricated by oil under pressure. As indicated in said figure the device 10 is secured to a shaft 31 rotatably journaled in a bearing assembly 32 seated in the end of a housing 33, the bearing 32 being maintained in housing 33 between an integral flange 34 and a cap 35 detachably secured to a flange 36 of housing 33 by screw bolts 37. Cap 35 is provided with a central aperture for receiving shaft 31 and is provided with a boss 38 surrounding the central aperture similar to boss 15.

The sealing device 10 in accordance with this form of the invention is mounted in the same manner as the device 10 illustrated in Figure 1 and is of the same construction except that the yieldable member 19' is of bellows like formation whereby shaft 31 may move slightly longitudinally relative to housing 33 without substantially affecting the oil sealing engagement between member 19' and disk 13.

This form of the invention is particularly adapted to vehicle rear axles or like constructions, in which the axle or shaft is subject to slight longitudinal movement in its bearings. In operation, the sealing device as disclosed in Figure 2, is the same as that disclosed in Figure 1. It will be observed that in both forms of the invention the sealing device is disclosed outside of the housing. This is advantageous because any heat generated by friction is readily dissipated and because the rubber 19 is not immersed in oil in such location. This arrangement constitutes an essential part of this invention.

In Figures 9, 10 and 11, are illustrated different exemplary applications of the sealing device illustrated in Figures 1 or 2.

In Figure 9 the invention is illustrated in connection with a motor boat propeller shaft in which it is necessary to prevent loss of lubricant as well as dilution thereof by water. As indicated in this figure, the shaft housing 41 at the forward end thereof is enlarged at 42 providing a chamber for a ball thrust bearing 43 which is maintained in position by a removable cap 44 provided with a boss 45. A propeller shaft 46 provided with an enlarged portion 47 for cooperation with bearing 43 extends through housing 41 and is provided on the rear end thereof with a propeller 47' in well known manner. The shaft 46 is lubricated by suitable lubricating oil fed through a line 49 under pressure or otherwise. Said oil should not escape past shaft 46 out of either end of housing 41 and water should not enter through the end of the housing adjacent the propeller.

Accordingly a sealing device 10 constructed as above described, is secured to shaft 46 for cooperation with each end of housing 41 and if oil is fed to housing 41 under pressure the form of sealing device illustrated in Figure 1 is preferably employed in order to automatically compensate for pressure changes and thus maintain an effective oil leakage seal.

The sealing device 10 will prevent the loss of lubricant from the opposite ends of housing 41 and as the rear end of housing 41 is exposed to action of the water the sealing device 10 at this end while preventing the loss of oil will likewise prevent the admission of water in housing 41 with a consequent diluting of the lubricating oil therein.

By the application of sealing devices constructed in accordance with this invention to motor boat propeller shafts in the manner disclosed fire hazards are substantially reduced and a conservation of oil as well as power is, therefore realized.

It will be observed further that the liquid seals 80 are disposed externally of housing 41 for purposes above indicated.

In Figure 10 is illustrated the application of the invention to a motor having a vertically disposed shaft. As indicated in this figure, 51 designates the base of a vertical motor on which is supported a rotor enclosing casing or shell 52 which in turn is surmounted by a cap or cover 53.

The base 51 and cover 53 comprise housings 54 and 55 respectively defining oil chambers and bearings for the oppositely extending vertical shafts 56 and 57 of rotor 58.

The shaft bearing housings 54 and 55 are provided with renewable apertured bushings 59 and 61 respectively and housings 54 and 55 are provided with oil feeding connections 62 and 63 respectively whereby oil is fed into the chambered housings and shafts 56 and 57 lubricated thereby through the aperture in bushings 59 and 61. A hardened and ground thrust washer 65 is disposed beneath rotor 58 for bearing engagement with base 51.

This type of motor is well known and has many desirable applications in industrial machinery, such as pumps, etc., but its application has been avoided at considerable cost in added machinery due to the fact that it is difficult to effectively retain lubricant in the housing chambers in opposition to the effect of gravity resulting in high maintenance cost of the motor.

This loss of oil can be avoided without imposing large frictional resistance to the rotation of the shaft by the application of a sealing device 10 constructed in accordance with the invention disclosed in Figure 1 or 2 to each shaft 56 and 57 with the disk 13 thereof in yieldable bearing engagement with a suitable boss on the bottom of each housing 54 and 55 whereby the oil is prevented from escaping along shafts 56 and 57 through the aperture therefor in the basis of oil retaining housings 54 and 55.

Thus by the provision of the relatively simple, inexpensive and easily installed sealing devices 10 constructed in accordance with the present invention vertical motors can be utilized without the present objection thereto, whereby lower costs and greater simplicity could be realized in many industrial machining installations.

In Figure 11 the invention is shown in connection with the water pump which generally comprises a casing 65 having an inlet 66 and an outlet 67. The casing embodies a bearing housing 68 providing an oil chamber through which extends, and in which is rotatably journalled a shaft 69 having secured thereto the impeller 71. Shaft 69 is lubricated by a ring 72 in well known manner. In the construction disclosed as well as in all similar water pump constructions it is not only desirable that the oil in the bearing housing be prevented from loss therefrom, but it is highly important that admixture of the oil and water be prevented. It is further desirable that the oil be prevented from escaping into the impeller compartment. These results are accomplished by this invention. As illustrated in Figure 11 a sealing device 10 of the construction illustrated in Figures 1 or 2 may readily be installed on shaft 69 with the disks 13 thereof cooperating with suitable bearing bosses on the opposite ends of the housing 68 thus positively checking the loss of oil while permitting proper lubrication of the bearing surfaces.

While the foregoing are examples of practical applications of the improved sealing device 10, the device is capable of application to rotating shafts in general for preventing the loss of oil from the bearing chambers in which the shafts rotate, the device 10 illustrated in Figure 1 being applicable to rotating shafts which are lubricated by oil under pressure and the similar device illustrated in Figure 2 being especially applicable rotating shafts which are capable of limited longitudinal movement and which are lubricated by oil not under any substantial pressure.

In Figure 3 is illustrated a modification of the invention which is of the same general construction as that illustrated in Figures 1 and 2 and which functions in the same general manner, but is adapted for use with rotating shafts which are so disposed that the space around same outside the bearing housing therefor will not admit of any substantially large diameter sealing device as illustrated in Figures 1 and 2.

In accordance with this modification of the invention, a sealing device of substantially small diameter is provided which comprises a metallic housing engaging and sealing member 75 which as illustrated in section and on an enlarged scale in Figure 5 comprises a shaft engaging relatively long hub portion 76 provided with longitudinally spaced gripping flanges 77 adjacent one end thereof. The member 75 is adapted to engage at one end of a bearing housing 79 in which a rotating shaft 81 is journaled in the same manner in which disk 13 engages boss 15, as indicated in Figures 1 and 2.

The member 75 is preferably constructed of soft metal after which the boss engaging end thereof is hardened about ⅛ inch back from the end and the end surface is ground for oil sealing contact with boss 78. This provides a sealing member which effectually seals the end of boss 78 against the escape of oil from housing 79. Said member is provided with soft, easily bendable flanges 77 which are bent or pinched or spun over the edge of an oil proof rubber sealing member 82 with the edge disposed between the flanges and tightly clamped therebetween in a fluid tight manner as indicated in Figure 3. The member 82 comprises a shaft engaging hub portion 83 from which projects a relatively thin flange portion 84 which in assembled position is of substantially flattened bulb formation, as indicated in Figure 3 thus defining a chamber 85 between member 75 and hub portion 83. The hub portion 83 is provided with a central bore for frictionally receiving shaft 81 and hub portion 83 is held in firm or positive engagement with shaft 81 for rotation therewith by means of a helical spring 86 engaged about the hub portion for tightly clamping same into engagement with shaft 81. A relatively light helical compression spring 87 is disposed in chamber 85 in surrounding relation to shaft 81 with the opposite ends thereof engaging member 75 and hub portion 83 for holding member 75 into oil sealing engagement with boss 78. This form of sealing device is simple in construction and is capable of application to rotating shafts having limited space therearound and the device is highly effective for preventing the loss of lubricating oil from the oil chamber within the shaft bearing housing. The device is, as shown, disposed externally of the oil carrying housing for reasons above stated.

The construction just described is highly effective for rotating shafts of relatively small diameter, but with rotating shafts of relatively large diameter a helical compression spring is not sufficiently effective for holding member 75 in oil sealing engagement with boss 78. Accordingly for such shafts the sealing device shown in Figure 3 is modified as indicated in Figure 4 in which a relatively large diameter shaft 88 is rotatively journaled in a lubricant carrying housing 89 and provided with the modified form of sealing device.

The sealing device in accordance with the modification of the invention is substantially identical to that disclosed in Figure 3 except that the helical spring 87 is replaced by a plurality of spaced circumferentially disposed and longitudinally extending small helical springs 91 which are disposed in chamber 85 for holding member 75 in even oil sealing bearing engagement with housing 89.

In the utilization of the springs 91 preferably a sheet metal ring 92 having laterally projecting lugs 93 is provided for locating and holding the springs 91 in accurate position as indicated in Figure 4.

As further indicated in said figure, the hub portion 83 of member 82 is secured to shaft 88 by a clamp 95 but a helical spring as indicated in Figure 3 may be employed instead of the clamp 95 if desired.

In Figure 6 is illustrated a further modification of the invention particularly adapted to use with automotive vehicle front axle constructions.

As indicated in this figure 97 designates the spindle on which is rotatably mounted the front wheel mount 98 through a roller bearing assembly 99 in accordance with the well established practice. As is well known, the bearing 99 is lubricated by grease and it has heretofore been the general practice to provide a felt seal ring seated in a groove in spindle 97 and frictionally engaging the inner surface of the rotating wheel mount 98 for preventing the loss of oil or grease from the bearing chamber closed by the hub cap.

These felt seal rings have a short life and cause considerable friction if made effective to hold the lubricant against centrifugal force and have proved inadequate for effectively preventing the escape of oil or grease. These felt rings are particularly objectionable when the front wheels are provided with brakes due to the escaping oil getting into the brake bands resulting in ineffective braking action thereof, and rendering the brake linings useless.

In accordance with this invention, the flange 101 of mount 98 which normally laps the hub portion of spindle 97 is cut back a short distance for the reception of a sealing device 102 constructed in accordance with this embodiment of the invention. As illustrated in Figure 6, the sealing device 102 comprises a metallic sealing member 103 having a bore for receiving the inner race of bearing 99 and a hardened ground face 104 for engaging the hub of spindle 97 in oil sealing relation. The member 103 is provided with an offset outwardly projecting flange 106 provided with circumferentially spaced and laterally projecting lugs 107 for positioning and holding a plurality of small helical springs 108 disposed between flange 106 and a shoulder 109 on mount 98 for holding member 103 in oil sealing engagement with the hub portion of spindle 97. Member 103 intermediate face 104 and flange 106 is provided with a recess 111 for receiving the edge of the vertically disposed portion 113 of an oil proof rubber sealing member 114 comprising in addition to portion 113 a horizontally disposed portion 115 for frictionally engaging the outer surface of mount 98 to prevent escape of oil from the bearing chamber around the edges of member 103. Said member is constructed of soft metal whereby recess 111 can be constructed for tightly holding the adjacent edge of sealing member 114 in position, the bearing end of member 103 being suitably hardened to provide a good bearing face 104 having a low coefficient of friction. A suitable guard 117 of sheet metal is provided for confining the otherwise exposed portion of member 103 for providing a neat appearance as well as preventing the ingress of water, dust and dirt.

The construction in accordance with this embodiment of the invention is comparatively simple, relatively inexpensive and well adapted for application to front wheel spindles as illustrated or to similar constructions without introducing large frictional losses.

In Figure 7 is illustrated a further modification of the invention in which a sealing device of this invention is provided that is especially adapted to an automotive vehicle propeller shaft for preventing the loss of lubricating oil from the differential housing along the propeller shaft. As indicated in this figure the reference character 121 designates a portion of the differential housing in which is rotatably journaled a propeller shaft section 122 by means of roller bearing assemblies 123 and 124 mounted in a bearing cage 125, the shaft section 122 carrying a driving pinion 126 in well known manner.

As is well understood, the bearing assemblies 123 and 124 are lubricated by oil or grease from the differential housing and it is highly important that the oil be prevented from escaping through the outer bearing assembly 123.

Accordingly, in accordance with this modification of the invention, a sealing device is disposed exteriorly of the housing for preventing the escape of oil from the housing. The sealing device in accordance with this form of the invention may be disposed on the usual bearing retaining nut 127 threadedly engaged with the shaft driving flange 128 and comprises a construction similar to that disclosed in Figure 3 but due to the fact that the metallic sealing member in this adaptation of the invention must engage a surface outward of the outer race of bearing 123 the sealing member 131 is modified by providing same with a relatively large diameter vertical flange portion 132 having a marginal horizontal hardened flange portion 133 adapted for oil sealing engagement with a shoulder 134 on the bearing cage 125. The other elements of the sealing device are similar to corresponding elements of the sealing device illustrated in Figure 3 and are accordingly designated by similar reference characters.

From the foregoing disclosure it will be seen that a sealing device is provided which is comparatively simple in construction can readily be assembled without dismounting any of the propeller shaft or differential housing parts and will effectually seal against loss of lubricating oil within the housing without setting up substantial friction between relatively movable parts.

In Figure 8 is illustrated a still further modification of the invention, particularly adapted to rear axle constructions for preventing the loss of lubricant from the axle housing or differential housing which is used for lubricating the bearing assembly for the drive axle sections.

As indicated in Figure 8, 135 designates a portion of the axle housing in which is adjustably threaded a bearing cage 136 provided with the roller bearing assembly 137. Cage 136 is provided with a centrally apertured web 138 intermediate its ends and against which one edge of the outer race of bearing assembly 137 abuts. Rotatably journaled in bearing 137 and extending through the aperture in web 138 is a driven shaft or axle section 141 to which is keyed outward of cage 136 a drive wheel 142.

The sealing device constructed in accordance with this embodiment of the invention is adapted to be installed on the drive axle 141 in oil sealing engagement with web 138.

The sealing device according to this embodiment of the invention is similar to the construction disclosed in Figure 4 embodying an oil proof rubber sealing member 82 similar to that shown in Figures 3 and 4, the hub portion of which is secured in oil tight relation to axle 141 for rotation therewith by means of a helical spring 143. In this embodiment of the invention the free edge of member 82 is clamped between flanges of a metallic sealing member 144 in the same manner as disclosed in Figures 3 and 4 and member 144 is preferably pressed into oil sealing engagement with web 138 by a plurality of small helical springs 145 in the manner disclosed in Figure 4.

It will be noted, however, that due to the limited space longitudinally of axle 141 and between the hub of wheel 142 and web 138 the member 144 is recessed as indicated at 146 for receiving substantial portions of springs 145 thereby providing a sealing device similar to that disclosed in Figure 4 which is applicable to smaller longitudinal spaces.

It will be seen upon inspection of Figure 8 that the sealing device can readily be installed in axle 142 thereon, and that, since it is disposed exteriorly of the housing the device is not immersed in oil.

In Figures 12 and 13 is illustrated a still further modification of the invention embodying a construction adapted for high pressure and heavy duty service and which is further adapted for ready repair.

As indicated in these figures, 151 designates a rotating shaft journalled in a housing 152 which housing in the customary manner is formed to provide a receptacle for oil for lubricating the rotating shaft 151. The housing 152 which may be of any conventional construction is provided with an extended portion in the form of a boss 153 for fluid tight engagement with a part of the rotating sealing device about to be described.

The sealing device is designated in its entirety by the character 154 and comprises as the constituent parts thereof a metallic housing engaging and sealing member 155 which may be constructed of "oil-less bearing metal", steel or other suitable material and which comprises a housing boss engaging extension 156, a longitudinally spaced vertical disk portion 157 and a further longitudinally spaced outwardly projecting vertical flange portion 158. The bearing face of extension 156 is preferably hardened and ground for fluid sealing bearing engagement with boss 153.

Disposed in engagement with the outer side of flange 158 is the peripheral portion of a yieldable sealing member 159 which is detachably secured in fluid tight relation with flange 158 by means of a plurality of screw bolts 161 projecting through corresponding apertures in member 159 and threadedly engaged in taps in flange 158 as well as in a metallic clamping ring 162.

The yieldable sealing member 159 is of disk formation preferably constructed of stock rubberized fabric and is provided with a central opening for the reception of an externally threaded hub 163 of an inner gland member 164 and the member 159 at the inner margin thereof is removably secured in fluid tight engagement with gland member 164 by means of an internally threaded collar 165 threadedly engaged with hub 163.

Hub 163 is provided with an end recess 166 in which rests one end of a shaft encircling helical spring 167 whose opposite end engages member 155, the spring being under compression for urging member 155 into fluid sealing engagement with boss 153 of housing 152.

A second gland member 168 is detachably connected to member 164 for longitudinal adjustment relative thereto by a circumferential series of screw bolts 169 and gland members 164 and 168 co-operatively enclose a shaft packing 171 which is adapted to be more or less compressed for preventing the leakage of oil outwardly of shaft 151 by adjustment of bolts 169.

The outer gland member 168 is provided with a hub portion 172 provided with diametrically aligned taps for the reception of set bolts 173 for effecting rotation of gland member and consequently the entire sealing device 154 with shaft 151.

This form of construction is applicable to rotating shafts in general externally of the bearing and lubricating housing and is particularly adapted to use where substantially high pressures obtain such as in marine constructions, refrigerators, etc.

The yieldable sealing member 159 is constructed of rubber impregnated fabric which is a readily obtainable product in sheet formation and is very strong thus adapting it to withstand very high pressures.

Thus it will be readily appreciated that by the use of this material for the yieldable sealing member not only is a high pressure sealing member provided but the sealing device can be readily repaired as it is not necessary to procure specially molded members but a member corresponding to that designated at 159 in the drawings can be cut from a sheet of readily obtainable stock material and quickly mounted in the position indicated.

The construction under discussion is substantially similar to the construction disclosed in Figure 1 and operates in the same general manner, it being desirable with the present construction to provide the shaft packing 171 due to the absence of the soft rubber sealing member as disclosed in Figure 1.

While several modified forms of sealing devices constructed in accordance with the present invention for installation with different forms of standard machine constructions are disclosed it will be seen that the sealing devices in all the modified forms are of the same general construction and function in the same manner. The sealing devices in all forms disclosed each comprising, exclusive of the securing means three elements, viz, a rotating shaft, gripping and oil sealing member preferably, but not necessarily constructed of rubber, a metallic housing sealing surface shaped to cooperate with said member, and a spring or springs for yieldably but lightly urging the metallic sealing member into oil sealing relation with said housing surface.

It will further be seen that in order to provide sealing devices of the general character disclosed adapted for installation with any particular rotating shaft slight altertions of the component elements thereof is necessary, in most instances it being only necessary to modify the form of the metallic housing and wall sealing member. Even though it be found necessary to alter all of the component elements to suit any given condition, this can be done at comparatively little expense since due to the simplicity of the device the cost of manufacture thereof is comparatively small.

It is to be particularly noted that the sealing devices constructed in accordance with the present invention are applicable to rotating shafts outside the housings in which the shafts are journaled thus making it extremely easy to install the sealing devices and furthermore, by installing the devices in this manner oil may flow to the bearing surfaces between the metallic sealing member and the housing wall. In this respect, this invention differs from existing seal rings thus providing an oil sealing device which will effectively hold the oil at high speeds and at the same time be sufficiently lubricated to avoid heating and consequent shortening of the life of the sealing device.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim as our invention is:—

1. In combination, a housing, a shaft rotatively mounted in said housing and extending therefrom, and means to prevent the flow of fluid along said shaft, comprising a member in sliding engagement with said housing, an abutment adjustably mounted on said shaft and clamped in fluid-tight non-rotative engagement therewith, a spring between said abutment and member, and a flexible element coupling said abutment and member together in a manner permitting relative movements of said member along said shaft under the action of said spring said element comprising an annular disc having its margins in fluid tight connection with said member and said abutment respectively.

2. In combination, a rotatable shaft; a housing wall through which said shaft projects, said housing wall including means for journalling said shaft; an annular bearing surface formed on said journalling means in a plane substantially normal to the axis of said shaft; and a sealing assembly rotatable with said shaft for preventing the leakage of fluid along said shaft past said bearing surface; said assembly comprising a device surrounding said shaft, said device comprising a pair of flexibly interconnected members one of which is secured to the shaft and the other of which has an annular surface longitudinally shiftable into running contact with said annular bearing surface to prevent leakage at the latter, and a compressible packing fitted within and substantially concentrically of said device in engagement with the periphery of said shaft to prevent fluid leakage longitudinally of the latter.

3. In the combination defined in claim 2, said packing being of the adjustable glandular type, and there being an internal spring fitted within said device between said annular surfaces and the packing and tending to hold said annular surfaces in contact with each other.

4. In combination, a rotatable shaft; a housing wall through which said shaft projects, said wall including means for journalling said shaft; an annular bearing surface formed on said journalling means in a plane substantially normal to the axis of said shaft; and a sealing assembly for preventing the leakage of fluid along said shaft past said bearing surface, said assembly comprising a pair of complemental elements relatively shiftable longitudinally of said shaft; one of said elements surrounding said shaft, and being shiftable along said shaft in both directions and provided with an annular surface in sealing contact with said bearing surface, the other of said elements embodying means for preventing it from moving longitudinally from said annular surfaces; resilient means fitted within said surrounding element and reacting against said other element to yieldingly urge said annular surfaces together, and a compressible packing incorporated within said assembly in peripheral sealing engagement with said shaft to prevent leakage longitudinally of the latter.

5. In combination, a rotatable shaft having a smooth portion of uniform cross section; a housing wall through which said shaft extends and beyond which said uniform portion projects, said wall including means surrounding said shaft; a narrow annular bearing surface formed on said means in a plane substantially normal to the shaft axis, said surface having an inner diameter closely approximating the shaft diameter; and a sealing assembly rotatable with said shaft for preventing leakage of fluid along said shaft past said bearing surface; said sealing assembly comprising a non-metallic member surrounding said shaft and being inherently capable of deformation, means for securely fastening and sealing one edge of said member with respect to said smooth uniform portion of the shaft with capacity for sliding adjustment along said portion, a metallic collar on the shaft adjacent said bearing surface, means carried by said collar for securing and sealing the other edge of said non-metallic member relative to the collar, and spring means reacting between said fastening means and said collar to yieldingly urge the latter into sealing contact with said annular bearing surface, said spring means being in direct pressure engagement with said collar at points on a circle of no greater diameter than that of said annular bearing surface.

ROLLIE B. FAGEOL.
WILLIAM E. LEIBING.